No. 645,589. Patented Mar. 20, 1900.
I. ERICKSON.
ANIMAL TRAP.
(Application filed Oct. 30, 1899.)

(No Model.)

Witnesses.
Edward F. Wray.
Homer L. Kraft.

Inventor.
Ivor Erickson
by Burton and Burton
his Atty's

THE NORRIS PETERS CO., PHOTO-LITHO., WASHINGTON, D. C.

UNITED STATES PATENT OFFICE.

IVAR ERICKSON, OF CHICAGO, ILLINOIS.

ANIMAL-TRAP.

SPECIFICATION forming part of Letters Patent No. 645,589, dated March 20, 1900.

Application filed October 30, 1899. Serial No. 735,337. (No model.)

*To all whom it may concern:*

Be it known that I, IVAR ERICKSON, a citizen of the United States, residing at No. 607 Evergreen avenue, Chicago, county of Cook, and State of Illinois, have invented certain new and useful Improvements in Animal-Traps, which are fully set forth in the following specification, reference being had to the accompanying drawings, forming a part thereof.

This invention relates to animal-traps which are designed principally for catching rats and mice and other small animals, but adapted to be used for trapping larger game.

Figure 1:
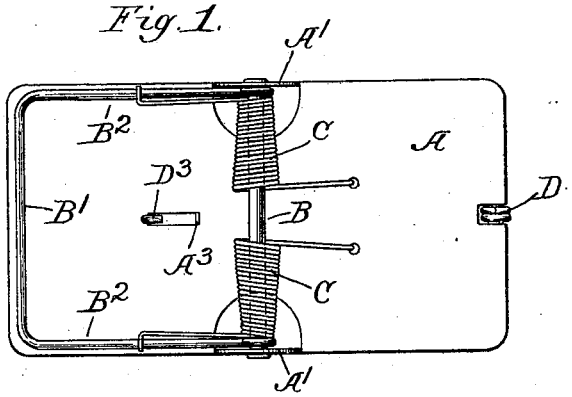
Figure 2:
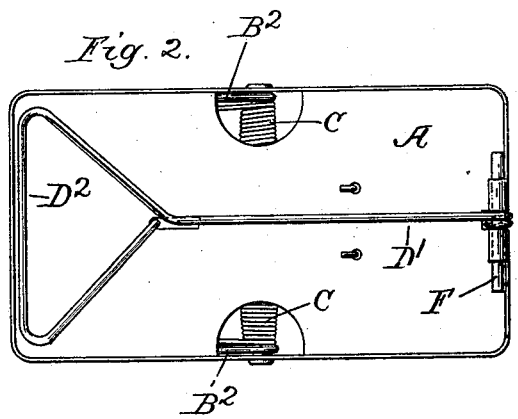
Figure 3:
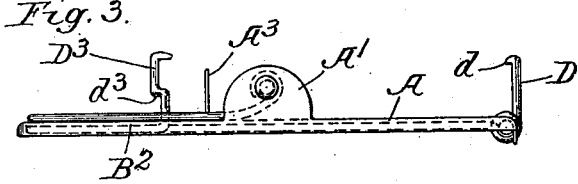
Figure 4:
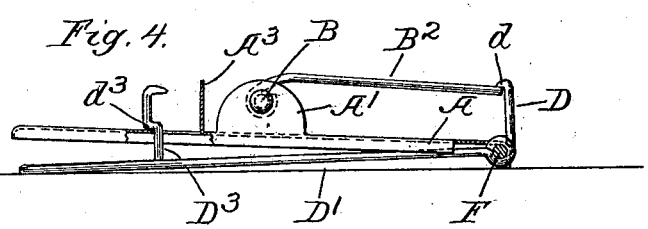

In the drawings, Figure 1 is a top plan of my improved trap, showing it not set. Fig. 2 is a bottom plan of the trap. Fig. 3 is a side elevation of the trap not set. Fig. 4 is a side elevation of the trap set, the platform being broken out at one place to show a certain detail.

A is the platform or base of the trap. From this platform or base, which is preferably made of sheet metal, I strike up the lugs A' A' at the lateral edges to form bearings for the fly, which is made of one piece of wire comprising a cross-bar B' and side bars or lever-arms B² B², pivoted on the fixed shaft B, which extends across the platform and is riveted into the lugs A' A'.

C C are springs coiled about the shaft B, one end of each being stopped by and preferably secured in the platform and the other end being engaged with the side bars or lever-arms B² B² of the fly, both springs operating with a tendency to hold the fly forward and down upon the forward end of the platform, but permitting it to be swung back to a position overhanging the rear end of the platform, where it is engaged by the catch D, which is the upstanding arm of a bell-crank lever, whose horizontal arm D' extends along under the platform to the forward end, being finished at that end with a cross-bar or foot D² parallel with the forward edge of the platform. This bell-crank lever I make of wire, and the cross-bar or foot at its forward end is preferably formed by bending the wire so as to inclose a triangle, of which the forward side constitutes the cross-bar. This bell-crank lever is pivoted at its angle to the under side of the platform, above which the upstanding arm D, which constitutes the catch, extends. This catch terminates in a very short hook or overhanging nose d, under which the cross-bar of the fly is engaged when this trap is set. In this position of the fly the springs C C are coiled under sufficient tension to throw the fly forward onto the forward end of the platform with sufficient force to not only imprison but probably kill the animal, which may be struck by it and caught under it. The bell-crank lever, which comprises the upstanding arm or catch and the horizontal arm D' ending in the foot D², is so disposed with respect to the point of engagement of the catch-nose with the cross-bar of the fly that when said parts are thus engaged (when the trap is set) the forward end or foot D² of the horizontal arm of the bell-crank lever is forced downward away from the platform and constitutes the bearing or support of the forward end of the trap on the floor, causing the forward end of the platform to be lifted up.

The weight of the platform and of any object which may rest on its forward end—as, for example, a mouse which may accidentally step upon the trap or be enticed thereinto by bait which may be lodged upon it—tends to carry downward the forward end of the platform with the same effect as if the forward end of the horizontal arm of the bell-crank lever had been lifted up toward the platform—that is to say, with the effect of tipping backward the nose or upper end of the upstanding arm or lever and carrying it off from the cross-bar of the fly, and so releasing the latter. This tendency is resisted only by the friction between the under side of the nose of the catch and the upper side of the cross-bar of the fly, for the nose is not hooked or in any manner so shaped as to engage forward of the cross-bar, but engages only above it. The extent of this engagement is designed to be such that while the weight of the platform alone is not sufficient to overcome the friction of said engagement and disengage the parts a very slight addition to the weight of the platform is sufficient to effect this result, so that a very light animal, such as a small mouse, treading upon the forward end of the platform will disengage the catch and cause the fly instantly to recoil toward the forward end of the platform, catching the animal thereon. Bait of any sort may be lodged upon the platform at sufficient distance back from its forward end and inward from the two sides to be out of reach of the animal designed to be trapped until and unless the animal steps on the platform, thus insuring that the bait cannot be taken by the animal without the latter being caught. For convenience a tang $A^3$ may be struck up from the platform at a suitable point to hold the bait; but this evidently is not necessary, since bait merely lodged on the platform would serve the same purpose.

In order to afford a guide for the arm $D'$ and keep it from being displaced horizontally, (as it might otherwise be, being pivoted only by wrapping it around pintle F,) I extend the end of the wire in the form of a finger $D^3$ up through the slot in the platform, which is made by striking up the tang $A^3$, and to check the arm and keep it near the platform in handling the trap I form a shoulder $d^3$ on the finger $D^3$ above the platform. The wire might be terminated with this shoulder; but it may be extended and hooked, as illustrated, and thus adapted to hold bait, so that in case an animal too light to trip the trap steps on the platform and seizes the bait the force of the upward pull given to the bait to detach it while the animal stands on the platform is added to the weight of the animal and increases the probability of springing the trap.

I claim—

1. A trap comprising a platform and a lever pivoted thereto at one end and extending under the platform toward the other end; a spring-actuating fly fulcrumed on the platform arranged to tension this spring by being swung about its fulcrum toward the pivoted end of the platform, the lever having a catch-finger which protrudes above the platform at the pivoted end; whereby the lever takes the weight of the platform at one end, and the catch is disengaged by depressing that end of the platform.

2. In combination with a platform A, a lever $D'$ pivoted thereto at one end and having an upstanding catch-finger D, the fly fulcrumed on the platform and the springs C C tending to hold said fly down upon the platform at the forward end of the latter, and adapted to be flexed or put under tension by rocking the fly about its fulcrum toward the opposite end, said fly and catch being relatively arranged so that the latter may engage the former when the fly is rocked over toward the rear end of the platform, and such engagement being effected by swinging the lever $D'$ down from the platform at the forward end, whereby it takes the weight of that end when the catch is engaged.

3. In combination with a platform A having the lugs $A'$ $A'$ struck up from its web, the shaft extending between said lugs and the fly comprising the side bars $B^2$ $B^2$ and the cross-bar $B'$ pivoted at the ends of said side bars on said shaft, the springs C C coiled about the shaft and stopped on the platform and engaging the side bars, of the fly D, and tending to hold the cross-bar down on the platform at one end, the lever D pivoted to the opposite end of the platform and extending under the same to the end on which the fly is held by the springs, and having an upstanding arm at its pivoted end provided with a nose adapted to engage the fly when the latter is rocked back toward that end.

4. In combination with a platform, the fly fulcrumed thereon, the lever pivoted thereto at one end and having the catch, D, said lever extending under the platform toward the other end, and having the finger $D^3$ extending up through the platform and adapted to hold bait, whereby the weight of the animal on the platform and the force used to detach the bait both operate to disengage the catch.

5. In combination with a platform of sheet metal, a spring-actuating fly fulcrumed thereon and comprising a cross-bar and opposite side bars extending therefrom to the fulcrum, and arranged to be held by the spring lying along one end and the two adjacent sides of the platform, the platform having a tang $A^3$ struck up from its web at a point within the area encompassed by the fly and its axis and at a point remote from the three edges of the platform along which the fly extends; a catch to lock the fly when it is swung over to the opposite end of the platform, and suitable means for causing the catch to become disengaged when the platform is depressed.

6. In combination with the platform of sheet metal, the spring-actuating fly fulcrumed thereon, the lever pivoted to the platform extending under the same and having the catch-finger to engage the fly, a bait-holding tang struck up at a point remote from its edges, the lever having a guide-finger which protrudes through the slot formed by striking up such tang, specifically as set forth.

In testimony whereof I have hereunto set my hand at Chicago, Illinois, this 21st day of October, 1899.

IVAR ERICKSON.

Witnesses:
CHAS. S. BURTON,
WASHINGTON LAYCOCK.